United States Patent
Dietz et al.

(10) Patent No.: US 12,532,883 B2
(45) Date of Patent: Jan. 27, 2026

(54) POWDER COMPOSITIONS COMPRISING SALTS OF $C_4$ TO $C_{10}$ OXOCARBOXYLIC ACIDS AND OF UNSATURATED OR AROMATIC $C_6$ TO $C_{10}$ CARBOXYLIC ACIDS

(71) Applicant: Cosphatec GmbH, Hamburg (DE)

(72) Inventors: Carsten Dietz, Neustadt A.d. Weinstrasse (DE); Malte Sietzen, Hamburg (DE); Markus Schröder, Hamburg (DE); Frank Brauns, Hamburg (DE); Chris Dechow, Hamburg (DE)

(73) Assignee: Cosphatec GmbH, Hamburg (DE)

( * ) Notice: Subject to any disclaimer, the term of this patent is extended or adjusted under 35 U.S.C. 154(b) by 784 days.

(21) Appl. No.: 17/593,839

(22) PCT Filed: Mar. 25, 2020

(86) PCT No.: PCT/EP2020/058364
§ 371 (c)(1),
(2) Date: Sep. 24, 2021

(87) PCT Pub. No.: WO2020/193632
PCT Pub. Date: Oct. 1, 2020

(65) Prior Publication Data
US 2022/0183288 A1    Jun. 16, 2022

(30) Foreign Application Priority Data
Mar. 26, 2019  (EP) .................... 19165083

(51) Int. Cl.
  *A01N 37/10*   (2006.01)
  *A01N 25/12*   (2006.01)
  *A01N 37/04*   (2006.01)
(52) U.S. Cl.
  CPC ........... *A01N 37/10* (2013.01); *A01N 25/12* (2013.01); *A01N 37/04* (2013.01)
(58) Field of Classification Search
  CPC ......... A01N 37/10; A01N 37/04; A01N 25/12
  See application file for complete search history.

(56) References Cited

U.S. PATENT DOCUMENTS

| | | | |
|---|---|---|---|
| 6,719,985 B1 * | 4/2004 | Tsubouchi | A61Q 1/12 424/401 |
| 7,416,722 B2 | 8/2008 | Straetmans et al. | |
| 2003/0147930 A1 | 8/2003 | Jun et al. | |
| 2013/0022562 A1 * | 1/2013 | Maunsell | A61K 8/0212 424/59 |
| 2016/0120803 A1 * | 5/2016 | Mathur | A61K 8/4993 514/169 |
| 2018/0008522 A1 | 1/2018 | Altman et al. | |
| 2019/0231748 A1 | 8/2019 | Zeng et al. | |

FOREIGN PATENT DOCUMENTS

| | | |
|---|---|---|
| EP | 1709955 A1 | 10/2006 |
| EP | 2065025 A2 | 6/2009 |
| WO | WO-2018/064978 A1 | 4/2018 |

OTHER PUBLICATIONS

International Application No. PCT/EP2020/058364, International Search Report and Written Opinion, mailed May 20, 2020.
European Patent Application No. 19165083.7, Extended European Search Report, dated May 13, 2019.

* cited by examiner

*Primary Examiner* — Michael B. Pallay
(74) *Attorney, Agent, or Firm* — MARSHALL, GERSTEIN & BORUN LLP

(57) ABSTRACT

The present invention relates to a composition comprising (a) an alkali metal salt and/or an alkaline earth metal salt of a C4 to C10 oxocarboxylic acid and (b) an alkali metal salt and/or an alkaline earth metal salt of an unsaturated or aromatic C6 to C10 carboxylic acid, wherein (a) is present in an amount of 20 to 95 wt.-%, based on the total mass of the composition, and (b) is present in an amount of 5 to 50 wt.-%, based on the total mass of the composition, wherein the composition is present in the form of a powder, methods of its manufacture and its use for inhibiting microbial growth in cosmetic, dermatological or personal care compositions.

13 Claims, 6 Drawing Sheets

FIG. 1A *Escherichia coli*
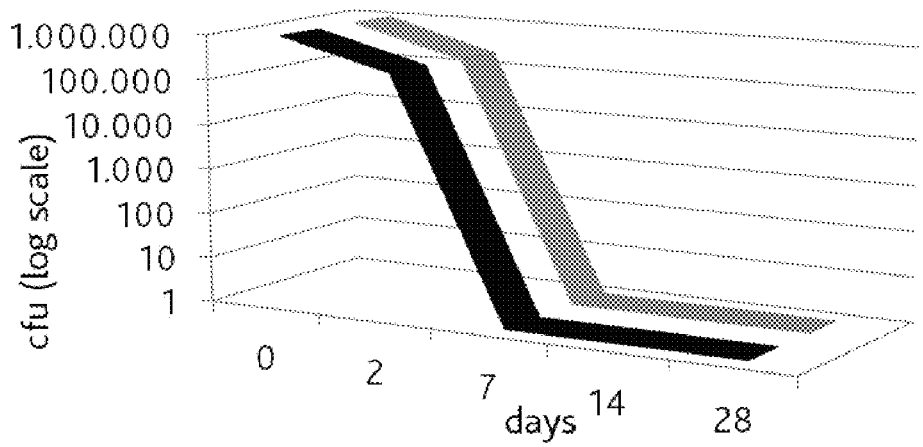
FIG. 1B *Pseudomonas aeroginosa*
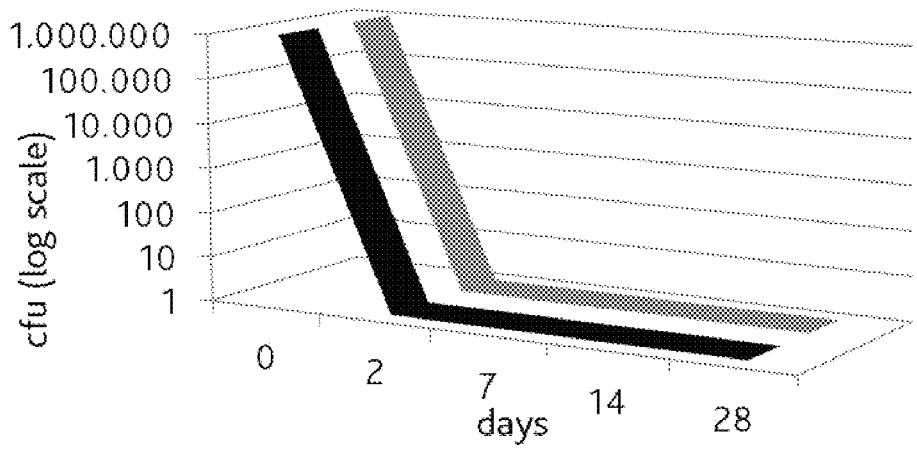
FIG. 1C *Staphylococcus aureus*
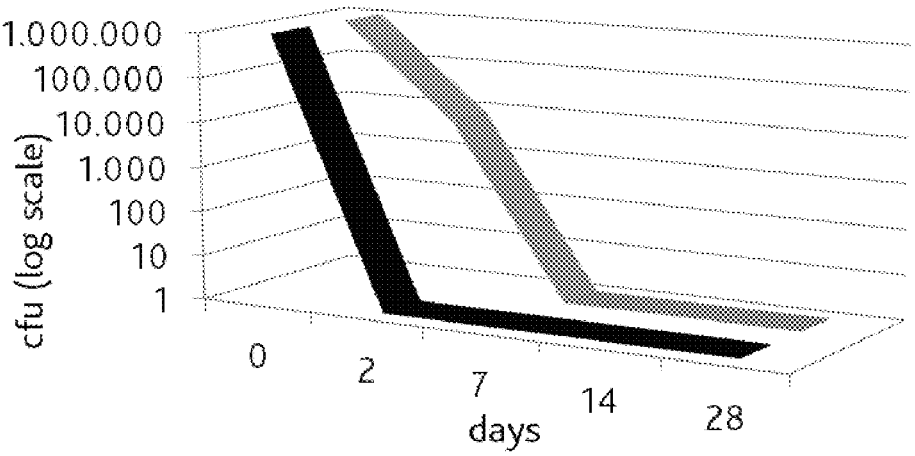

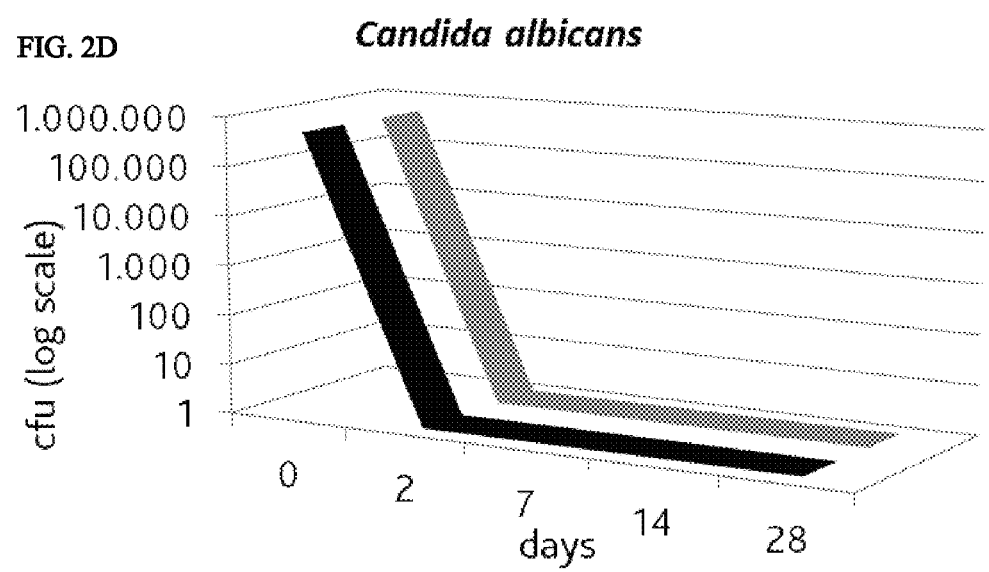
FIG. 2D *Candida albicans*
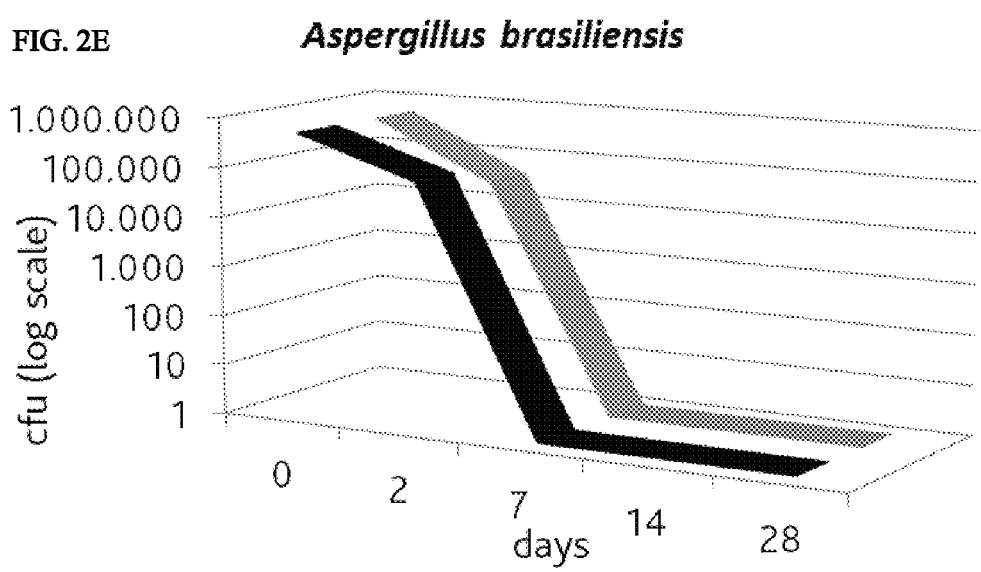
FIG. 2E *Aspergillus brasiliensis*

POWDER COMPOSITIONS COMPRISING SALTS OF $C_4$ TO $C_{10}$ OXOCARBOXYLIC ACIDS AND OF UNSATURATED OR AROMATIC $C_6$ TO $C_{10}$ CARBOXYLIC ACIDS

The present invention relates to powder compositions comprising salts of $C_4$ to $C_{10}$ oxocarbox-ylic acids such as levulinic acid and of unsaturated or aromatic $C_6$ to $C_{10}$ carboxylic acids such as p-methoxybenzoic acid and their use in the field of cosmetics, in particular as a composition for inhibiting microbial growth in cosmetic and related compositions and products.

BACKGROUND OF THE INVENTION

The industrial production of cosmetic products requires a continuous improvement of ingredients to reduce material costs, storage area, transport costs, to replace criticized raw materials and to increase the occupational safety.

Antimicrobial substances which control the growth of microorganisms such as pathogenic bacteria, yeasts and fungi strains protect the products from spoilage and thus are indispensable ingredients for cosmetic formulations. Besides commonly used preservatives listed in local regulatory statutes, so-called "Multifunctionals", i.e., raw materials that combine several positive effects including an antimicrobial efficiency, are becoming more and more of interest. One important category of this class of raw materials are medium-strength organic acids which have traditionally been used in cosmetic products for decades. In the last few years, especially 4-oxovaleric acid (levulinic acid) and p-methoxybenzoic acid (anisic acid) gained considerable interest within the cosmetic industry. Levulinic_acid (CAS #123-76-2) is mainly used for its perfuming and skin conditioning functions. An additional benefit of this acid is the strong anti-microbial efficiency against gram-positive and gram-negative bacteria (Table 1). Levulinic acid is commonly combined with p-methoxybenzoic acid (CAS #100-09-4), which is used for its masking effect. In comparison to levulinic acid, p-methoxybenzoic acid has an even stronger antimicrobial effect that also includes a strong efficiency against yeasts and molds. This is illustrated by the data given in Table 1 (US 2003/0147930 A1.).

TABLE 1

Minimal Inhibitory Concentration (MIC)
of levulinic and p-methoxybenzoic acid

| Microbial Strains | MIC levulinic acid (%) | MIC p-methoxybenzoic acid (%) |
|---|---|---|
| Escherichia coli | 0.20 | 0.16 |
| Staphylococcus aureus | 0.35 | 0.08 |
| Pseudomonas aeruginosa | 0.15 | 0.16 |
| Candida albicans | 0.60 | 0.04 |
| Aspergillus brasiliensis | — | 0.0025 |

However, good antimicrobial effectiveness alone is not sufficient—ease of use is of similar importance. In this regard both organic acids have disadvantages: Levulinic acid is a crystalline solid at room temperature and must be molten before use, requiring additional time and energy resources. p-methoxybenzoic acid displays poor solubility in water (0.2 g/L at 20° C.). (Echa Registration Dossier for p-Methoxybenzoic acid: https://echa.europa.eu/de/registration-dossier/-/registered-dossier/24279/4/9)

This aspect is of particular importance, as developers of personal care formulations have high demands regarding convenience of handling and application of ingredients. Raw materials with significant drawbacks in this respect are either not used if alternatives are available, or are em-ployed in the form of pre-mixed blends to circumvent any solubility issues.

EP-A-1 709 955 relates to the use of levulinic acid and p-methoxybenzoic acid in water-based applications based on a partially neutralized pre-mixed blend with a polyol such as glycerin, and water. This approach allows one to dissolve higher concentrations of both acids in water compared to solutions without polyol, thus creating a user-friendly blend with broad antimicrobial efficiency. However, the concentration of acids in thi's mixture is still low while additionally containing high amounts of water and polyol. The latter two components improve solubility issues and prevent solidification, but are not antimicrobially active themselves. Consequently, an application concentration of around 4% of the liquid mixture is needed to achieve an effi-cient antimicrobial effect, because 75% of the liquid mixture consists of water and glycerin. This is associated with four major disadvantages:

- Increased freight costs and environmental burden from transporting large amounts of water and glycerin as part of the mixture
- Blocking of additional storage space
- Need for additional packaging material,
- Natural glycerin is usually palm-oil derived—a plant source often judged critically.

In Europe transport costs per truck km are between 0.5-1.5 Euro. Based on the data of the German Federal Environmental Agency (German Federal Environmental Agency, TREMOD calculation, 2017), the emission data of the freight transports are as shown in Table 2:

TABLE 2

Emission data of freight transports determined in 2017

| Emissions | Unit per 1 t goods | Truck | Freight rail | Waterway transport (inland) |
|---|---|---|---|---|
| Greenhouse gases ($CO_2$, $CH_4$ and $N_2O$) | g/km | 103 | 19 | 32 |
| Carbon monoxide | g/km | 0.076 | 0.013 | 0.070 |
| Volatile hydrocarbons (except $CH_4$) | g/km | 0.035 | 0.002 | 0.027 |
| Nitrogen oxide | g/km | 0.217 | 0.037 | 0.413 |
| Particulates (except abrasion) | g/km | 0.003 | 0.001 | 0.010 |

The additional freight costs as well as the environmental burden due to dilution of the active components with Water and glycerin are immense. It becomes apparent that a more ecological alternative to the current state of the art of levulinic acid and p-methoxybenzoic acid utilization is desirable, especially considering that both materials are manufactured from renewable resources, claiming to be a green alternative to synthetic preservatives.

In accordance with the teaching of EP-A-1 709 955, the authors of EP-A-2 065 025. use as a preservative a liquid composition based on sodium levulinate and sodium anisate in glycerine and water available at the time as a commercial product called Dermosoft 1388®.

Accordingly, it is an object of the present invention to provide a composition containing in particular levulinic acid and p-methoxybenzoic acid as active ingredients, or related acids, wherein said composition avoids the disadvantages as disclosed above. In particular, said composition should be present in a form that is convenient to store, transport and process, in particular as a component of cosmetic or related compositions and products.

SUMMARY OF THE INVENTION

The above object(s) is solved by a composition comprising (a) an alkali metal salt and/or an alkaline earth metal salt of a $C_4$ to $C_{10}$ oxocarboxylic acid such as levulinic acid and (b) an alkali metal salt and/or an alkaline earth metal salt of an unsaturated or aromatic $C_6$ to $C_{10}$ carboxylic acid such as p-methoxybenzoic acid, wherein (a) is present in an amount of 20 to 95 wt.-%, based on the total mass of the composition, and (b) is present in an amount of 5 to 50 wt.-%, based on the total mass of the composition, wherein the composition is present in the form of a powder.

According to one aspect of the present invention, the composition is obtainable by spray drying a liquid mixture comprising the alkali metal salt and/or the alkaline earth metal salt of $C_4$ to $C_{10}$ oxocarboxylic acids such as levulinic acid and unsaturated or aromatic $C_6$ to $C_{10}$ carboxylic acids such as p-methoxybenzoic acid.

According to another aspect of the present invention, the composition is obtainable by combin-ing the alkali or alkaline earth metal salt of $C_4$ to $C_{10}$ oxocarboxylic acids such as levulinic acid in powder form with the alkali salt and/or the alkaline earth metal salt of unsaturated or aromatic $C_6$ to $C_{10}$ carboxylic acids such as p-methoxybenzoic acid in powder form and subsequently mixing the two components to obtain a mixed powder, wherein the sizes of the powder particles of the two components are essentially the same.

According to another aspect, the present invention relates to a method for manufacturing the composition as defined herein, wherein a liquid mixture comprising the alkali metal salt and/or the alkaline earth metal salts of $C_4$ to $C_{10}$ oxocarboxylic acids such as levulinic acid and of unsaturated or aromatic $C_6$ to $C_{10}$ carboxylic acids such as p-methoxybenzoic acid is prepared by adding the corresponding acids to a solvent and further adding an alkali metal hydroxide and/or an earth alkaline metal hydroxide to form a liquid mixture and spray drying said mixture to form a spray dried powder.

Thus, surprisingly, it has been found that it is possible to retain the relevant advantages of the current state of the art, namely high solubility, ease of use and broad antimicrobial effectiveness, while at the same time completely eliminating the need for water/polyol solvents. This is achieved by utilizing a solid mixture of the salts of both acids obtained by spray drying of an appropriate pre-solution or by grinding and mixing of the single ingredients. The resulting fine powder is a highly water soluble, easy to use mixture, which not only displays a broad antimicrobial effectiveness, but is also free of water and polyols, thus posing a considerable improvement of the current state of the art. In addition, due to the exclusion of glycerin, any palm-oil issues are avoided.

Preferred embodiments are disclosed in the following description and in the appended claims.

Preferred embodiments of the invention may consist of the components of the compositions and steps of the methods as disclosed herein. The use of the article "a" is not to be construed as limiting the number of an ingredient to "one".

SHORT DESCRIPTION OF THE FIGURES

FIGS. 1A-1E show challenge test results for the composition of the present invention used in an O/W emulsion with a final pH value of 5.5.

FIGS. 2A-2E show challenge test results for the composition of the present invention used in a shampoo with a final pH value of 5.5.

DETAILED DESCRIPTION OF THE INVENTION

Figure 1D:
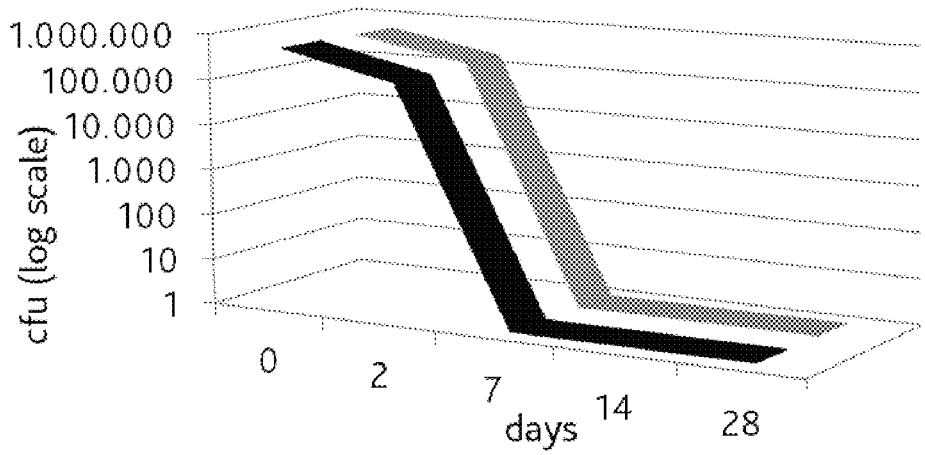
Figure 1E:
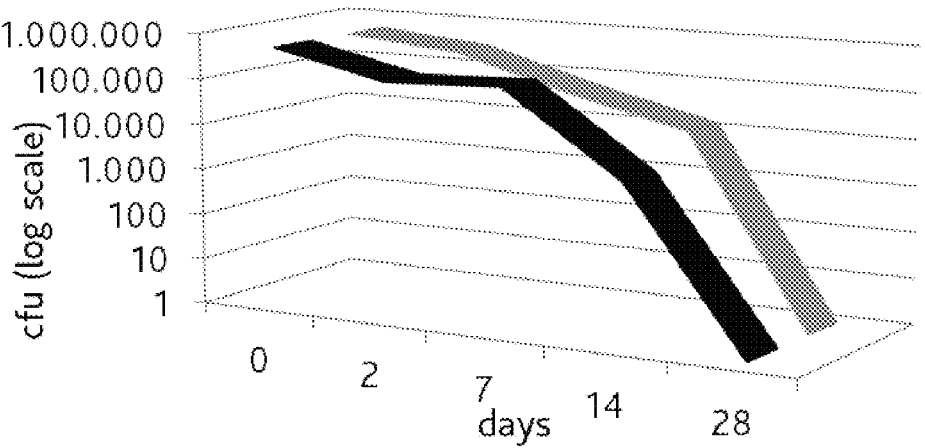
Figure 2A:
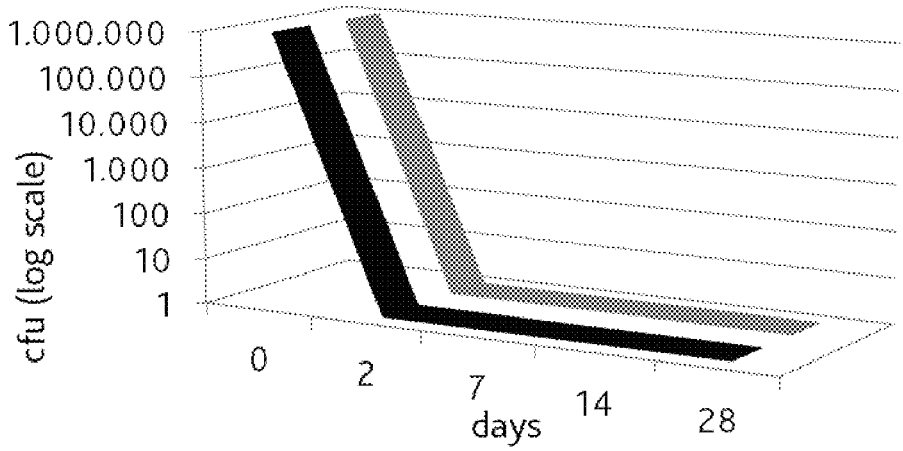
Figure 2B:
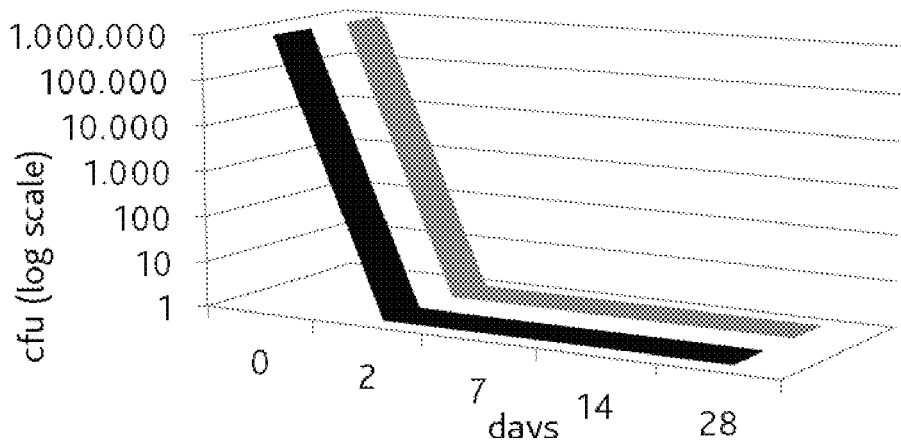
Figure 2C:
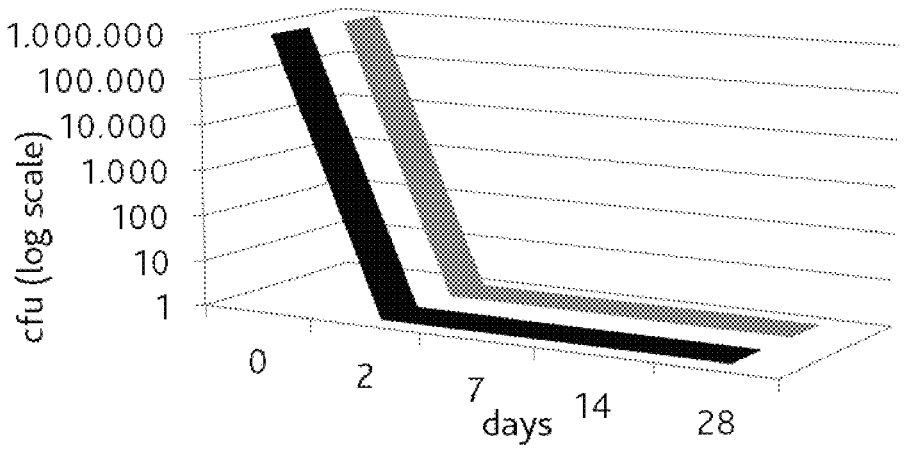

Component (a) of the composition of the present invention is an alkali metal and/or alkaline earth metal salt of a $C_4$ to $C_{10}$ oxocarboxylic acid, preferably a $C_4$ to $C_8$ oxocarboxylic acid, more preferably a $C_4$ to $C_6$ oxocarboxylic acid and most preferably levulinic acid. Component (b) of the composition of the present invention is an alkali metal salt and/or an alkaline earth metal salt of an unsaturated or aromatic $C_6$ to $C_{10}$ carboxylic acid, preferably a $C_6$ to $C_8$ aromatic acid which may be substituted with a hydroxyl, a methoxy or an acrylic group (—OH, —OCH$_3$, —CHCHCOOH), more preferably substituted with hydroxyl or methoxy, most preferably 4-methoxybenzoic acid (also termed para- orp-methoxybenzoic acid orp-anisic acid). Specific examples of the aforementioned acids which are used for preparing the salts are levulinic acid, ben-zoic acid, salicic acid, sorbic acid, cinnamic acid and 4-methoxybenzoic acid. The metal salt is preferably an alkali metal salt, more preferably an alkali metal salt selected from the group consisting of sodium and potassium, and is most preferably sodium.

Antimicrobial efficiency of a solid mixture according to the present invention containing levulinic acid and p-methoxybenzoic acid salts as preferred active ingredients was compared to that of the corresponding liquid mixture according to the state of the art by challenge by testing according to the standard procedure described in the European Pharmacopeia (8.8.0). The results are shown in FIGS. 1A-1E and FIGS. 2A-2E. Both the liquid mixture (grey lines) and the powder (black lines) contain the same ratio of levulinic- and p-methoxybenzoic acid salts. Each germ was tested separately and counted on day 2, 7, 14 and 28. For the tests, 4.0% of the liquid mixture consisting of sodium levulinate, sodiump-methoxybenzoate, water and glycerin was used and compared to 1.0% of the dried powder consisting of sodium levulinate and sodium p-methoxybenzoate. Taking into account standard variations in microbiological tests, both antimicrobial mixtures exhibit the same efficiency. Thus, by omitting the solvents, anti-microbial efficiency per gram product is increased by 400% in comparison to the liquid mixture.

Specifically, FIGS. 1A-1E shows challenge test results in an O/W emulsion with a final pH value of 5.5. The grey line represents 4.0% of the liquid Sodium levulinate and Sodi-ump-methoxybenzoate mixture dissolved in water and Glycerin as currently described by the state of the art. The black line represents 1.0% of the new sodium levulinate and sodium p-methoxybenzoate powder. Values were standardized to 1.000.000 inoculation concentration for bacteria and 500.000 for yeasts and molds.

Furthermore, FIGS. 2A-2E shows challenge test results in a shampoo with a final pH value of 5.5. The grey line represents 4.0% of the liquid sodium levulinate and sodium p-methoxybenzoate mixture dissolved in water and glycerin as currently described by the state of the art.

The black line represents 1.0% of the new sodium levulinate and sodium p-methoxybenzoate powder. Values were standardized to 1.000.000 inoculation concentration for bacteria and 500.000 for yeasts and molds.

Notably, the solubility of the powder mixture according to the present invention is excellent both in water and in the most common personal care formulations such as emulsions, shampoos or shower gels. For example, while sodium p-methoxybenzoate may be dissolved and then transferred into the antimicrobially active acid by decreasing the pH value, there is at least one polymorphic crystal modification of this compound that displays a low solubility (under such conditions) and tends to precipitate in higher concentrations or at low temperatures (see EP 1 709 955 A1). Surprisingly, the present inventors found that this behavior does not occur when using the salt mixture of the present invention. Without wishing to be bound by theory, this may be due to the different physical properties of both acids and their corresponding salts. Furthermore, levulinic acid shows good water solubility and a low melting point (33-35° C.) while p-methoxybenzoic acid shows low water solubility and a high melting point (183° C.). The sodium salt of p-methoxybenzoate is easier to produce because the sodium salt of levulinic acids shows a much higher hygroscopicity. It appears that the presence of levulinic acid salts is able to avoid the formation of low soluble crystal modifications of p-Methoxybenzoic acid. This is another advantage associated with the present invention.

Generally, the compositions of the present invention comprise the alkali metal salt and/or the alkaline earth metal salt of the $C_4$ to $C_{10}$ oxocarboxylic acid such as levulinic acid in an amount of 20 to 95 wt.-%, based on the total mass of the composition. Preferred amounts are 40 to 90 wt.-% or, more preferably, 60-80 wt.-%. The alkali metal salt and/or the alkaline earth metal salt of the unsaturated or aromatic $C_6$ to $C_{10}$ carboxylic acid such as p-methoxybenzoic acid is present in an amount of 5 to 80 wt.-%, based on the total mass of the composition. Preferred amounts are 10 to 60 wt.-% or, more preferably, 20-40 wt.-%.

Two manufacturing methods of compositions according to the present invention are disclosed.

The methods are described with regard to the salts of the preferred acid mixture of the present invention, i.e., levulinic acid and paramethoxybenzoic acid. However, it is to be understood that the following disclosure also applies to the more general definitions of components (a) and (b) of the compositions of the present invention.

In one embodiment of the invention, the alkali metal salts and/or the alkaline earth metal salts of levulinic acid and p-methoxybenzoic acid, such as in particular the sodium or potassium salts, in particular the sodium salts, are produced separately and subsequently combined by mixing the two components in the form of powders. Two problems that might occur are: 1) The Brazil nut effect caused by different particle sizes resulting in unintended segregation and 2) The different hygroscopicities of both salts. According to the present invention, the Brazil nut effect is avoided by grinding the mixture so that a uniform particle size is obtained. Of course, a person of skill in the art will appreciate that the particles will show a certain size distribution. However, said distribution is sufficiently narrow that the above-mentioned problems do not occur. This can be controlled by visual inspection or well-known methods for determining particle size distributions such as static light scattering (laser diffraction). For example, particle size distribution can be determined according to ISO 13322 "Particle Size Analysis-Laser Diffraction Methods" using as the analyzer the instrument Bettersizer 2600 suitable for particle size and shape measurements in the range of from 0.02 to 2,600 μm available from 3P Instruments GmbH & Co. KG, Odelzhausen, Germany. Grinding of highly hygroscopic substances like sodium levulinate can be accomplished by operating the mixing vessel under the atmos-phere of a water-free gas such as dried air, nitrogen or argon. The water content of the gas should be below 100 ppm. Elevated temperatures should be avoided, as they promote water uptake. The presence of a non-hygroscopic p-methoxybenzoate salt further helps to reduce the hygroscopicitiy of the mixture. The compositions of the mixture comprise the alkali metal salt and/or the alkaline earth metal salt of levulinic acid in an amount of 20 to 95 wt.-%, based on the total mass of the composition. Preferred amounts are 40 to 90 wt.-% or, more preferably, 60-80 wt.-%. The alkali metal salt and/or the alkaline earth metal salt ofp-methoxybenzoic acid is present in an amount of 5 to 80 wt.-%, based on the total mass of the composition. Preferred amounts are 10 to 60 wt.-% or, more preferably, 20-40 wt.-%. A particle size range of about 0.5 μm to about 100 m is generally achieved, as determined by using a Bettersizer 2600 and DIN ISO 13320. A small percentage of particles may have a size of below or above the indicated range. Usually, the percentage of such particles is about 1% or lower.

More specifically, a preferred particle size distribution is characterized by the following D values: D10: 4-10 μm; D50: 10-25 μm; D90: 30-50 μm. The D value means the weight percentage of particles having a size of or below the indicated value. It is determined based on the method as disclosed hereinabove.

In another embodiment of the invention, the composition is produced by spray-drying. In a first step both acids are added into a suitable solvent such as water and/or an alcohol such as ethanol. An alternative solvent is a mixture of water and alcohol because p-methoxybenzoic acids shows a much better solubility in ethanol (50 mg/ml at 20° C.) than in water (0.3 mg/ml at 20° C.). Preferred mixtures are aqueous solutions consisting of 70-90 wt.-% water and 10-30 wt.-% alcohol.

In a second step, the pH value is increased by adding an alkali metal base and/or an alkaline earth metal base until the salts of both acids are formed. Tests revealed that the total concentration of acids should be less than 35 wt.-%, if water is used as a solvent, because at higher concentrations they tend to precipitate. A suitable composition of the solution consists of 30 wt.-% acids, 9.75 wt.-% sodium or potassium hydroxide and 60.25 wt.-% water. This mixture is then spray dried. Spray drying as such is known in the art.

Figure 3:
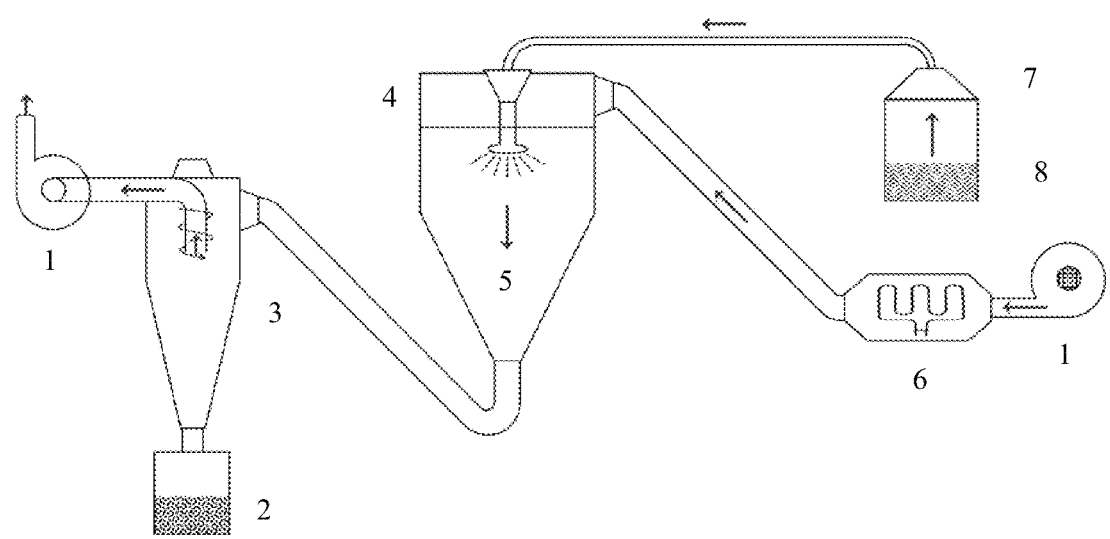
FIG. 3 illustrates a spray drying process according to the present invention.

FIG. 3 illustrates an embodiment of the spray drying process of the present invention. Levulinic acid and p-methoxybenzoic acid are dissolved in water by increasing the pH value and added to the liquid container 8. The mixture is pumped to the dispenser 4 and dried by hot air received from a fan 1 combined with a heater 6. The dried particles are separated in a cyclone separator 2 equipped with fan 1. In the spray drying step, a certain amount of the heat required for per-forming the step may be provided by the heat generated during the formation of the salts of the two acids as described above.

Significant advantages of this embodiment of the production method of the present invention are that, on the one hand, a Brazil nut effect is impossible because every particle consists of the final mixture of both acids. Furthermore, the presence of the salt of levulinic acid prevents the formation of low soluble p-methoxybenzoic acid salt crystals.

According to the present invention, the handling and application of levulinic acid and p-methoxybenzoic acid in personal care formulations have been greatly improved.

Freight costs, trans-portation mediated environmental impact, packing materials and storage area can be reduced dramatically, while simultaneously avoiding palm-oil derived raw materials. At the same time, no deficits regarding antimicrobial efficiency or convenience of use are to be expected.

The present invention is further illustrated by the embodiments disclosed in the following examples.

Examples

In the following, application examples in personal care formulations of one embodiment of the present invention are given. The solid antimicrobial mixture is a combination of sodium levulinate and sodium p-methoxybenzoate in a ratio of 4:1 to 2:1, preferably 3:1. The fluffy white solid mixture is produced by spray drying and shows a particle size distribution in the range of about 0.5 µm to about 100 µm.

Figure 4:
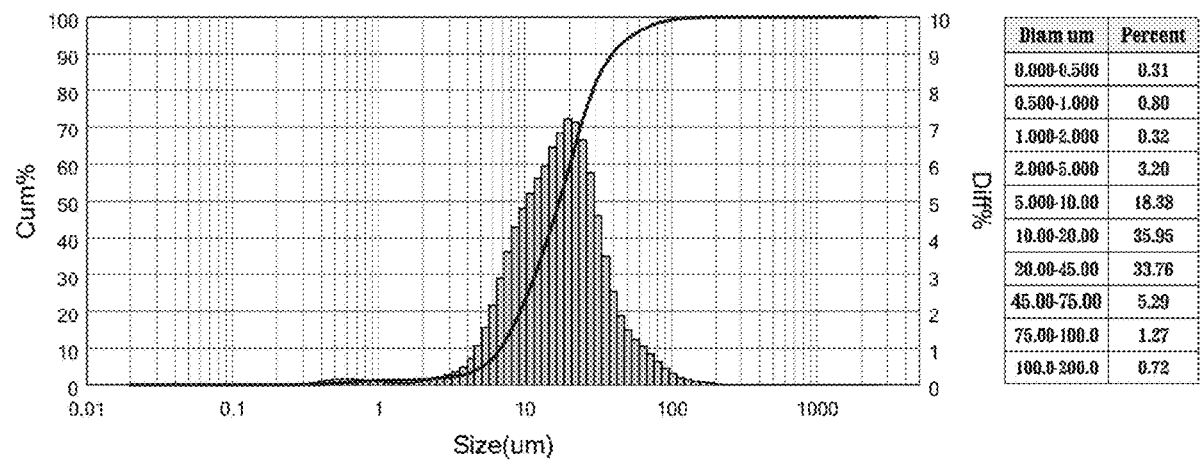
FIG. 4 shows a specific particle size distribution of a mixture of the sodium salts of levulinic acid and 4-methoxybenzoic acid.

Specifically, the particle size distribution was determined using DIN method ISO 13320 and a Bettersizer 2600 available from 3P Instruments suitable for particle size measurements in the range of from 0.02 to 2,600 µm (wet dispersion) and 0.1 to 2,600 m (dry dispersion over a large scattering angle range (0.016° to 165°) with high detector density (92 pieces)). In the present examples, the specific particle size distribution as determined by using the above instrument is reproduced in FIG. 4.

Example 1—Anti-Aging Serum

The components of the anti-aging serum of Example 1 are listed below:

| Phase | Ingredient | INCI | % |
|---|---|---|---|
| A | Demin. Water | Aqua | Ad. 100 |
| A | Glycerin | Glycerin | 5.00 |
| A | Cosphaderm ® Propanediol natural | Propanediol | 2.00 |
| A | Cosphaderm ® Sodium Hyaluronate high | Sodium Hyaluronate | 0.30 |
| A | Cosphaderm ® Sodium Hyaluronate low | Sodium Hyaluronate | 0.20 |
| B | Cosphaderm ® Sodium LAAS | Sodium Levulinate, Sodium Anisate | 1.00 |

This formulation can be prepared at room temperature. All ingredients of phase A are combined and stirred until everything is completely dissolved. Cosphaderm® Sodium LAAS is added to phase A and pH is adjusted to 5.5±0.05 if necessary.

Example 2—Conditioning Shampoo

The components of the conditioning shampoo of Example 2 are listed below:

| Phase | Ingredient | INCI | % |
|---|---|---|---|
| A | Demin. Water | Aqua | Ad. 100 |
| A | Cosphaderm ® Propanediol natural | Propanediol | 3.00 |
| A | Glycerin | Glycerin | 3.00 |
| A | Cosphaderm ® Sodium LAAS | Sodium Levulinate, Sodium Anisate | 1.00 |
| A | Cosphaderm ® X 34 | Xanthan Gum | 1.00 |
| B | Sodium Coco Sulfate | Sodium Coco-Sulfate | 6.50 |
| B | Lauryl Glucoside | Lauryl Glucoside, Aqua | 7.36 |
| B | Cocamidopropyl Betaine | Cocamidopropyl Betaine, Aqua | 4.88 |
| B | Plantacare 818 UP | Coco Glucoside, Aqua | 2.50 |
| B | Cosphaderm ® E NGM | Lysolecithin | 1.00 |
| B | Cosphaderm ® Magnolia Extract 98 | Magnolia Officinalis Bark Extract | 0.05 |

Phase A is combined and stirred until everything is dissolved. Phase B is combined and both phases are heated separately up to 50° C. Phase A is added to phase B under soft stirring. Air bubbles are to be avoided. The pH is adjusted to 5.0±0.05.

Example 3—Micellar Water

The components of the micellar water of Example 3 are listed below:

| Phase | Ingredient | INCI | % |
|---|---|---|---|
| A | Demin. Water | Aqua | Ad. 100 |
| A | Aloe Vera Gel (0.5%) | Aqua, Aloe Barbadensis Leaf Juice Powder | 50.00 |
| A | Cosphaderm ® Propanediol natural | Propanediol | 3.00 |
| A | Glycerin | Glycerin | 5.00 |
| A | Cosphaderm ® PA ECONAT | Phytic Acid, Aqua | 0.10 |
| A | Decyl Glucoside | Decyl Glucoside, Aqua | 3.80 |
| B | Cosphaderm ® Sodium LAAS | Sodium Levulinate, Sodium Anisate | 1.00 |

All ingredients of phase A are mixed at room temperature under slow stirring. Phase B is added to phase A. The pH is adjusted to 5.5±0.05.

Example 4—Moisturizing Daycream

The components of the moisturizing day cream of Example 4 are listed below:

| Phase | Ingredient | INCI | % |
|---|---|---|---|
| A | Demin. Water | Aqua | Ad. 100 |
| A | Glycerin | Glycerin | 3.00 |
| A | Cosphaderm ® PA ECONAT | Phytic Acid, Aqua | 0.10 |

-continued

| Phase | Ingredient | INCI | % |
|---|---|---|---|
| B | Cosphaderm ® X 34 | Xanthan Gum | 0.20 |
| B | Aristoflex ® AVC | Ammonium Acryloyldimethyltaurate/VP Copolymer | 1.00 |
| B | Cosphaderm ® Sodium LAAS | Sodium Levulinate, Sodium Anisate | 1.00 |
| C | Cosphaderm ® E NGM | Lysolecithin | 1.50 |
| C | Cegesoft ® SH | Shorea Stenoptera Seed Butter | 2.50 |
| C | Sunflower Oil | Helianthus Annuus Seed Oil | 2.00 |
| C | Jojoaba Oil | Simmondsia Chinensis Seed Oil | 2.00 |
| C | Softisan ® 154 | Hydrogenated Palm Oil | 1.00 |
| C | Cosphaderm ® AP | Ascorbyl Palmitate | 0.20 |
| C | Cosphaderm ® T-70 NON GMO ECO | Tocopherol, Helianthus Annuus Seed Oil | 0.30 |
| C | Cosphaderm ® Touch | Heptyl Undecylenate | 1.00 |

Phase A: All ingredients are mixed together.

Phase B: Cosphaderm® X 34 and Aristoflex AVC are slowly added under vigorous stirring to phase A. Stirring is continued for approx. 15 min. at 500 rpm until complete dissolution. Then, it is heated up to 80° C.

Phase C: All ingredients are mixed together and heated up to 80° C.

Phase C is added to phase A+B and homogenized via vigorous stirring for approx. 10 min.

Phase D is added below 40° C. under vigorous stirring. pH is adjusted if necessary.

Example 5—Sensitive Handwash

The components of the sensitive handwash of Example 5 are listed below:

| Phase | Ingredient | INCI | % |
|---|---|---|---|
| A | Demin. Water | Aqua | Ad. 100 |
| A | Cosphaderm ® Sodium LAAS | Sodium Levulinate, Sodium Anisate | 1.00 |
| A | Cosphaderm ® PA ECONAT | Phytic Acid, Aqua | 0.10 |
| A | NaCl | Sodium Chloride | 2.00 |
| B | Plantapon ® SF | Sodium Cocoamphoacetate, Glycerin, Lauryl Glucoside, Sodium Cocoyl Glutamate, Sodium Lauryl Glucose Carboxylate | 40.00 |
| B | Lamesoft ® PO 65 | Coco-Glucoside, Glyceryl Oleate | 2.00 |

The formulation can be prepared at room temperature. Phase A is combined and stirred until everything is completely dissolved. Phase B is mixed and added to phase A. The pH is adjusted under stirring to 5.5±0.05.

Example 6—Soothing 2-in-1-Makeup Remover

The components of the soothing 2-in-1 makeup remover of Example 6 are listed below:

| Phase | Ingredient | INCI | % |
|---|---|---|---|
| A | Demin. Water | Aqua | Ad. 100 |
| A | Glycerin | Glycerin | 5.00 |
| A | Cosphaderm ® PA ECONAT | Phytic Acid, Aqua | 0.10 |
| A | Decyl Glucoside | Decyl Glucoside, Aqua | 0.30 |
| B | Cosphaderm ® Sodium LAAS | Sodium Levulinate, Sodium Anisate | 1.00 |
| C | Cosphaderm ® Feel | Triheptanoin | 20.00 |
| C | Cosphaderm ® T-70 NON GMO | Tocopherol, Helianthus Annuus Seed Oil | 0.10 |
| C | Oil soluble color | — | q.s. |

All ingredients of phase A are mixed at room temperature under slow stirring. Phase B is mixed until everything is completely dissolved and B is added to phase A. The pH of phase A+B is adjusted to 5.5±0.05. Phase C is combined and added to phase A+B without stirring.

LIST OF REFERENCE NUMERALS

1: fan
2: dried goods
3: cyclon separator
4: dispenser
5: dry room
6: heater
7: pump
8: liquid container

The invention claimed is:

1. Composition comprising a mixture of (a) an alkali metal salt and/or an alkaline earth metal salt of levulinic acid and (b) an alkali metal salt and/or an alkaline earth metal salt of p-methoxybenzoic acid, wherein (a) is present in an amount of 20 to 95 wt.-%, based on the total mass of the composition, and (b) is present in an amount of 5 to 80 wt.-%, based on the total mass of the composition, and wherein the mixture of (a) and (b) is present in the form of a powder in which every particle consists of (a) and (b).

2. Composition according to claim 1, wherein the mixture of (a) and (b) is obtainable by spray drying a liquid mixture comprising component (a) and component (b).

3. Composition according to claim 2, wherein the mixture of (a) and (b) is obtainable by preparing a liquid mixture comprising the alkali metal salts and/or the alkaline earth metal salts of levulinic acid and p-methoxybenzoic acid by adding the corresponding acids to a solvent containing water and ethanol and further adding an alkali metal hydroxide and/or an earth alkaline metal hydroxide to form the liquid mixture and spray drying said mixture to form a spray dried powder.

4. Composition according to claim 1, wherein the particle size of the mixture of (a) and (b) is in the range of from about 0.5 μm to about 100 μm, wherein the D90 value, as determined by static light scattering, is in the range of from 30 to 50 μm.

5. Composition according to claim 1, wherein the alkali metal is sodium or potassium.

6. Composition according to claim 1, wherein the composition consists of particles consisting of the mixture of (a) and (b).

7. Composition according to claim 1, comprising the alkali metal salt of levulinic acid and the alkali metal salt of p-methoxybenzoic acid, wherein the alkali metal is sodium.

8. Method for manufacturing the composition according to claim 1, wherein a liquid mixture comprising the alkali metal salt and/or the alkaline earth metal salts of the levulinic acid and the p-methoxybenzoic acid is prepared by adding the corresponding acids to a solvent and further adding an alkali metal hydroxide and/or an earth alkaline metal hydroxide to form a liquid mixture and spray drying said mixture to form a spray dried powder.

9. Method according to claim 8, wherein the liquid mixture used for spray drying is a solution containing water and an alcohol and an alkali metal salt.

10. Method according to claim 8, wherein levulinic acid and p-methoxybenzoic acid are first dissolved and/or dispersed in water and/or an alcohol, followed by addition of an alkali metal hydroxide, to obtain the liquid mixture for spray drying.

11. Method according to claim 8, wherein the liquid mixture has the following composition: p-methoxybenzoic acid: 5-15 wt-%, levulinic acid: 15-40 wt-%, alkali or alkaline earth metal salt: 5-15 wt-%.

12. Method of inhibiting microbial growth in cosmetic, dermatological or personal care compositions comprising adding a composition according to claim 1 to said cosmetic, dermatological or personal care compositions.

13. Method of claim 12, wherein the component (a) is sodium levulinate and wherein the component (b) is sodium p-methoxybenzoate.

* * * * *